(12) United States Patent
Yazawa et al.

(10) Patent No.: US 11,323,370 B2
(45) Date of Patent: May 3, 2022

(54) COMMUNICATION DEVICE, COMMUNICATION METHOD, AND PROGRAM

(71) Applicant: NIPPON TELEGRAPH AND TELEPHONE CORPORATION, Tokyo (JP)

(72) Inventors: Go Yazawa, Musashino (JP); Tatsuya Fukui, Musashino (JP); Chunhsiang Huang, Musashino (JP); Hideaki Kimura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/976,601

(22) PCT Filed: Feb. 28, 2019

(86) PCT No.: PCT/JP2019/007943
§ 371 (c)(1),
(2) Date: Aug. 28, 2020

(87) PCT Pub. No.: WO2019/168126
PCT Pub. Date: Sep. 6, 2019

(65) Prior Publication Data
US 2021/0006494 A1 Jan. 7, 2021

(30) Foreign Application Priority Data
Mar. 1, 2018 (JP) .............................. JP2018-036250

(51) Int. Cl.
*H04L 45/745* (2022.01)
*H04L 12/46* (2006.01)

(52) U.S. Cl.
CPC ........ *H04L 45/745* (2013.01); *H04L 12/4641* (2013.01)

(58) Field of Classification Search
CPC ..................... H04L 45/745; H04L 12/4641
See application file for complete search history.

(56) References Cited

U.S. PATENT DOCUMENTS

2002/0172207 A1* 11/2002 Saito .................... H04L 61/2084
370/400
2003/0112803 A1* 6/2003 Matsugatani ..... H04L 29/12311
370/389

(Continued)

OTHER PUBLICATIONS

Toru Uchino, Kazuki Takeda, Kunihiko Teshima. "Achieve even higher speed and capacity Carrier Aggregation Advanced and Dual Connectivity." NTT DOCOMO Technical Journal, vol. 23, No. 2 (2015). https://www.nttdocomo.co.jp/binary/pdf/corporate/technology/rd/technical_journal/vol23_2/vol23_2/vol23_2_008jp.pdf. Machine translation attached.

*Primary Examiner* — William G Trost, IV
*Assistant Examiner* — Monishwar Mohan

(57) ABSTRACT

An object is to provide a communication device, a communication method, and a program that make it possible to suppress an increase in the communication band due to communication via a GWR when Dual Connectivity is implemented, without making an additional setting on base stations. A communication device according to the present invention enables a communication packet to be transferred through a path that is shorter than conventional paths, and can therefore suppress an increase in the communication band. Also, this short cut of the communication path need only be set on the communication device, and need not be additionally set on the base stations.

7 Claims, 22 Drawing Sheets

(56) References Cited

U.S. PATENT DOCUMENTS

| | | | | |
|---|---|---|---|---|
| 2011/0122844 A1* | 5/2011 | Harper | .................. | H04L 67/148 |
| | | | | 370/331 |
| 2015/0103673 A1* | 4/2015 | Shimada | ............. | H04L 43/0811 |
| | | | | 370/241.1 |
| 2016/0029284 A1* | 1/2016 | Liu | ..................... | H04L 41/0896 |
| | | | | 370/232 |
| 2017/0041223 A1* | 2/2017 | Akashi | ................ | H04L 61/6009 |

* cited by examiner

Fig. 19

| DEVICE | LAYER | DOMAIN | ADDRESS | PORT |
|---|---|---|---|---|
| Z | L3(IP) | Subnet A | zz | 3 |
| | L2(Ethernet) | VLAN 10 | Z | |
| Y | L3(IP) | Subnet A | yy | 1 |
| | L2(Ethernet) | VLAN 10 | Y | |
| | L3(IP) | Subnet B | yy' | 2 |
| | L2(Ethernet) | VLAN 20 | Y' | |
| W | L3(IP) | Subnet B | ww | 4 |
| | L2(Ethernet) | VLAN 20 | W | |

| DEVICE | LAYER | DOMAIN | ADDRESS | PORT |
|---|---|---|---|---|
| Z | L3(IP) | Subnet A | zz | 3 |
| | VxLAN L3 | VNID a | wy | |
| | VxLAN L2 | | z | |
| | L2(Ethernet) | VLAN 10 | Z | |
| Y | L3(IP) | Subnet A | yv | 1 |
| | VxLAN L3 | VNID a | yw | |
| | VxLAN L2 | | y | |
| | L2(Ethernet) | VLAN 10 | Y | |
| | L3(IP) | Subnet B | yy' | 2 |
| | VxLAN L3 | VNID b | y'w | |
| | VxLAN L2 | | y' | |
| | L2(Ethernet) | VLAN 20 | Y' | |
| W | L3(IP) | Subnet B | ww | 4 |
| | VxLAN L3 | VNID b | wy' | |
| | VxLAN L2 | | w | |
| | L2(Ethernet) | VLAN 20 | W | |

| | | α | β | γ | δ |
|---|---|---|---|---|---|
| Pure L2/L3 Header | Des MAC | Y | Y | W | W |
| | VLAN ID | 10 | 10 | 20 | 20 |
| | Des IP | ww | ww | ww | ww |
| | Subnet mask | B | B | B | B |
| VxLAN Header | Des MAC | - | y | w | - |
| | Des IP | - | yw | wy' | - |
| | VNID | - | a | b | - |

| DEVICE | LAYER | DOMAIN | ADDRESS | PORT |
|---|---|---|---|---|
| Z | L3(IP) | Subnet A | zz | 3 |
| Z | L2(Ethernet) | VLAN 10 | Z | 3 |
| Y | L3(IP) | Subnet A | yy | 1 |
| Y | L2(Ethernet) | VLAN 10 | Y | 1 |
| Y | L3(IP) | Subnet B | yy' | 2 |
| Y | L2(Ethernet) | VLAN 20 | Y' | 2 |
| W | L3(IP) | Subnet B | ww | 4 |
| W | L2(Ethernet) | VLAN 20 | W | 4 |
| X | L3(IP) | Subnet C | xx | 1/2 |
| X | L2(Ethernet) | - | Y/Y' | 1/2 |

COMMUNICATION DEVICE, COMMUNICATION METHOD, AND PROGRAM

CROSS-REFERENCE TO RELATED APPLICATIONS

This application is a 371 U.S. National Phase of International Application No. PCT/JP2019/007943, filed on Feb. 28, 2019, which claims priority to Japanese Application No. 2018-036250, filed on Mar. 1, 2018. The entire disclosures of the above applications are incorporated herein by reference.

TECHNICAL FIELD

The present disclosure relates to a communication device whose communication ports belong to different communication domains, a communication method for the same, and a program for causing a computer to function as the communication device.

BACKGROUND ART

Dual Connectivity has been studied as a technology for increasing user throughput even in the case where the delay in a network (NW) between mobile base stations is relatively large (e.g. see Non-Patent Literature 1).

CITATION LIST

Non Patent Literature

[NPL 1] NTT DOCOMO Technical Journal Vol. 23, No. 2 (https://www.nttdocomo.co.jp/binary/pdf/corporate/technology/rd/technical_journal/bn/vol23_2/vol23_2_008jp.pdf, searched on Feb. 16, 2018)

SUMMARY OF THE INVENTION

Technical Problem

FIG. 1 is a diagram illustrating the case of increasing throughput by means of Dual Connectivity in a state where a main base station and a secondary base station belong to different IP subnets. In this case, communication needs to be performed through a communication path for Dual Connectivity via a router (GWR; Gateway Router), which is a gateway for the base stations, and a problem arises in that the communication band is excessively consumed for the communication via the GWR.

As a technology for solving this problem, it is conceivable to perform communication via a Layer 3 (L3) device other than the GWR. For example, a mode is conceivable in which an L3 router is inserted into a Layer 2 (L2) network connected to the GWR to separate the subnet thereof as shown in FIG. 2. In this case, however, an additional setting needs to be made on the base stations, and a problem arises in that, if the number of base stations is very large, the setting operation requires long time.

To solve the foregoing problems, an object of the present invention is to provide a communication device, a communication method, and a program that make it possible to suppress an increase in the communication band due to communication via the GWR when Dual Connectivity is implemented, without making an additional setting on the base stations.

Means for Solving the Problem

To achieve the above object, a communication device according to the present invention is disposed joined to different networks, checks the destination of a communication packet, and changes a communication path to shorten the communication path when possible.

Specifically, the communication device according to the present invention is a communication device that includes a plurality of communication ports and enables a communication packet to be transferred between different communication domains, the communication device including:

a setting table for setting, for each of the communication ports, a communication domain to which each of the communication ports belongs and a transfer destination address of a communication packet in each communication layer; and a path change unit that, when a communication port receives a transfer packet, reads, from the transfer packet, transmission destination addresses and transmission destination communication domains in a highest communication layer that is highest and a lower communication layer that is lower than the highest communication layer, reads out, from the setting table, an address and a communication domain in the lower communication layer that correspond to the transmission destination address in the highest communication layer, and, if the address in the lower communication layer read out from the setting table differs from the transmission destination address in the lower communication layer of the transfer packet, overwrites the transmission destination address and the communication domain in the lower communication layer of the transfer packet with the address and the communication domain in the lower communication layer read out from the setting table, and changes a path for transmitting the transfer packet from a communication port that corresponds to the address and the communication domain in the lower communication layer read out from the setting table.

Also, a communication method according to the present invention is a communication method for enabling a communication device that includes a plurality of communication ports to transfer a communication packet between different communication domains, the method including:

using a setting table for setting, for each of the communication ports, a communication domain to which each of the communication ports belongs and a transfer destination address of a communication packet in each communication layer; and when a communication port receives a transfer packet, reading, from the transfer packet, transmission destination addresses and transmission destination communication domains in a highest communication layer that is highest and a lower communication layer that is lower than the highest communication layer, reading out, from the setting table, an address and a communication domain in the lower communication layer that correspond to the transmission destination address in the highest communication layer, and, if the address in the lower communication layer read out from the setting table differs from the transmission destination address in the lower communication layer of the transfer packet, overwriting the transmission destination address and the communication domain in the lower communication layer of the transfer packet with the address and the communication domain in the lower communication layer read out from the setting table, and transmitting the transfer packet from a communication port that corresponds to the address and the communication domain in the lower communication layer read out from the setting table.

This communication device can transmit a communication packet through a path that is shorter than conventional paths, and accordingly, an increase in the communication band can be suppressed. Also, this short cut of the communication path need only be set on the communication device, and need not be additionally set on the base stations. Accordingly, the present invention can provide a communication device and a communication method that make it possible to suppress an increase in the communication band due to communication via a GWR when Dual Connectivity is implemented, without making an additional setting on the base stations.

The communication device according to the present invention further includes an updating unit that, when a transfer packet is received, reads, from the transfer packet, the transmission source addresses and the transmission source communication domains in the highest communication layer and the lower communication layer, and, if the addresses and the communication domains for the communication port that has received the transfer packet differ from addresses and communication domains written in the setting table, updates the setting table such that the transmission source addresses and the transmission source communication domains in the highest communication layer and the lower communication layer read from the transfer packet are described as the addresses and the communication domains for the communication port that has received the transfer packet.

This communication device can learn a new short-cut path only by transferring the communication packet. Note that, if the communication device learns all short-cut paths, the communication device may not be able to normally transfer communication packets. For this reason, the following measures are taken.

The communication device according to the present invention further includes:

an exception setting unit in which a combination is described in advance, the combination being constituted by at least one of a specific communication port, an address in a specific communication layer, and a specific communication domain, or by at least two of the specific communication port, the address in the specific communication layer, and the specific communication domain; and a function of not allowing the path change unit to change the path if a combination is described in the exception setting unit, the combination being constituted by at least one of the communication port that has received the transfer packet, the communication port for transmitting the transfer packet, a transmission source address in one of the communication layers read from the transfer packet, a transmission destination address in one of the communication layers read from the transfer packet, a communication domain to which a transmission source communication device of the transfer packet belongs, and a communication domain to which a transmission destination communication device of the transfer packet belongs, or by at least two of the communication port that has received the transfer packet, the communication port for transmitting the transfer packet, the transmission source address in the one of the communication layers read from the transfer packet, the transmission destination address in the one of the communication layers read from the transfer packet, the one of the communication domains to which the transmission source communication device of the transfer packet belongs, and the one of the communication domains to which the transmission destination communication device of the transfer packet belongs.

The communication device according to the present invention further includes:

a function of not allowing the path change unit to change the path if the transmission destination address in the highest communication layer read from the received transfer packet is a multicast address.

It is also preferable to make a setting to discard the transfer packet in a predetermined case.

The communication device according to the present invention further includes:

an interruption target setting unit in which a combination is described in advance, the combination being constituted by at least one of a specific communication port, an address in a specific communication layer, and a specific communication domain, or by at least two of the specific communication port, the address in the specific communication layer, and the specific communication domain; and a function of not allowing the path change unit to transmit the transfer packet if a combination is described in the interruption target setting unit, the combination being constituted by at least one of the communication port that has received the transfer packet, the communication port for transmitting the transfer packet, a transmission source address in one of the communication layers read from the transfer packet, a transmission destination address in one of the communication layers read from the transfer packet, a communication domain to which a transmission source communication device of the transfer packet belongs, and a communication domain to which a transmission destination communication device of the transfer packet belongs, or by at least two of the communication port that has received the transfer packet, the communication port for transmitting the transfer packet, the transmission source address in the one of the communication layers read from the transfer packet, the transmission destination address in the one of the communication layers read from the transfer packet, the one of the communication domains to which the transmission source communication device of the transfer packet belongs, and the one of the communication domains to which the transmission destination communication device of the transfer packet belongs.

The present invention is a program for causing a computer to function as the above-described communication device. The communication device according to the present invention can also be realized by a computer and a program, and the program can be recorded in a recording medium and provided through a network.

Effects of the Invention

The present invention can provide a communication device, a communication method, and a program that make it possible to suppress an increase in the communication band due to communication via a GWR when Dual Connectivity is implemented, without making an additional setting on the base stations.

BRIEF DESCRIPTION OF DRAWINGS

FIG. 19 is a diagram illustrating a setting table that the communication device according to the present invention has.

FIG. 20 is a diagram illustrating a setting table that the communication device according to the present invention has.

FIG. 21 is a diagram illustrating header content of a packet in communication zones of a communication system that includes the communication device according to the present invention.

FIG. 22 is a diagram illustrating a setting table that the communication device according to the present invention has.

DESCRIPTION OF EMBODIMENTS

Embodiments of the present invention will be described with reference to the attached drawings. The embodiments described below are examples of the present invention, and the present invention is not limited to the following embodiments. Note that constituent elements with the same reference signs in the specifications and the drawings are identical to each other.

Embodiment 1

Figure 1:
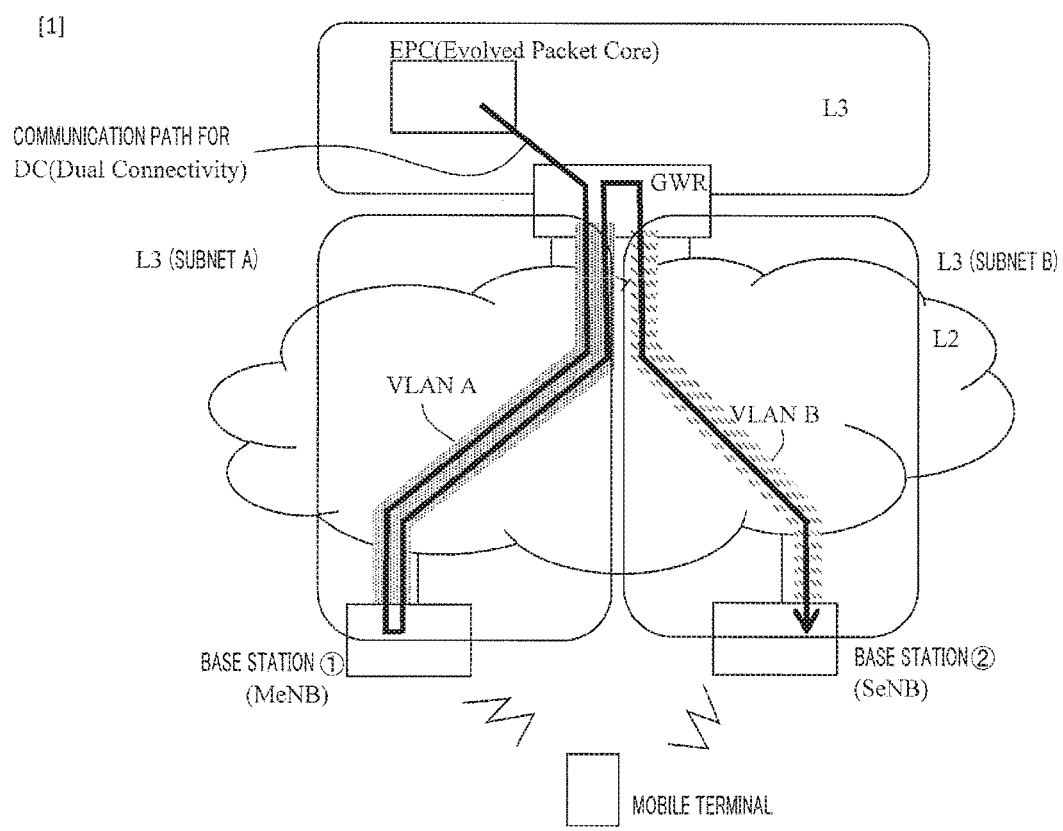
FIG. 1 is a diagram illustrating a problem of the present invention.
Figure 2:
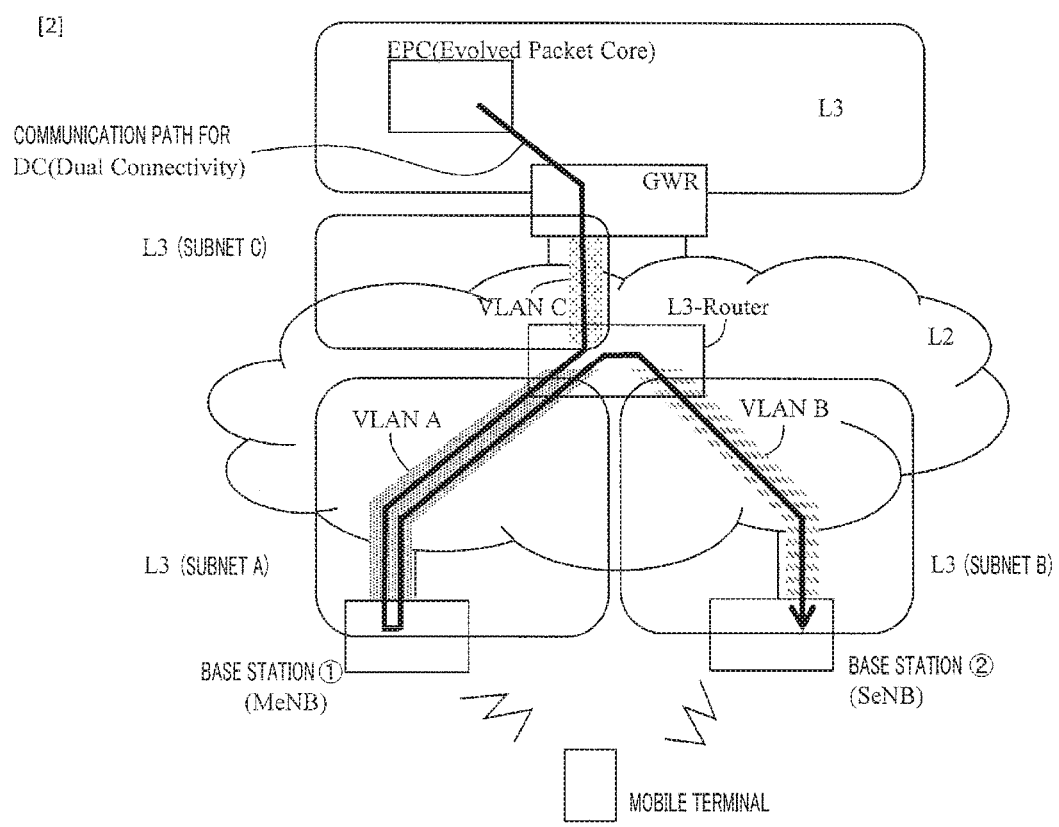
FIG. 2 is a diagram illustrating a problem of the present invention.
Figure 3:
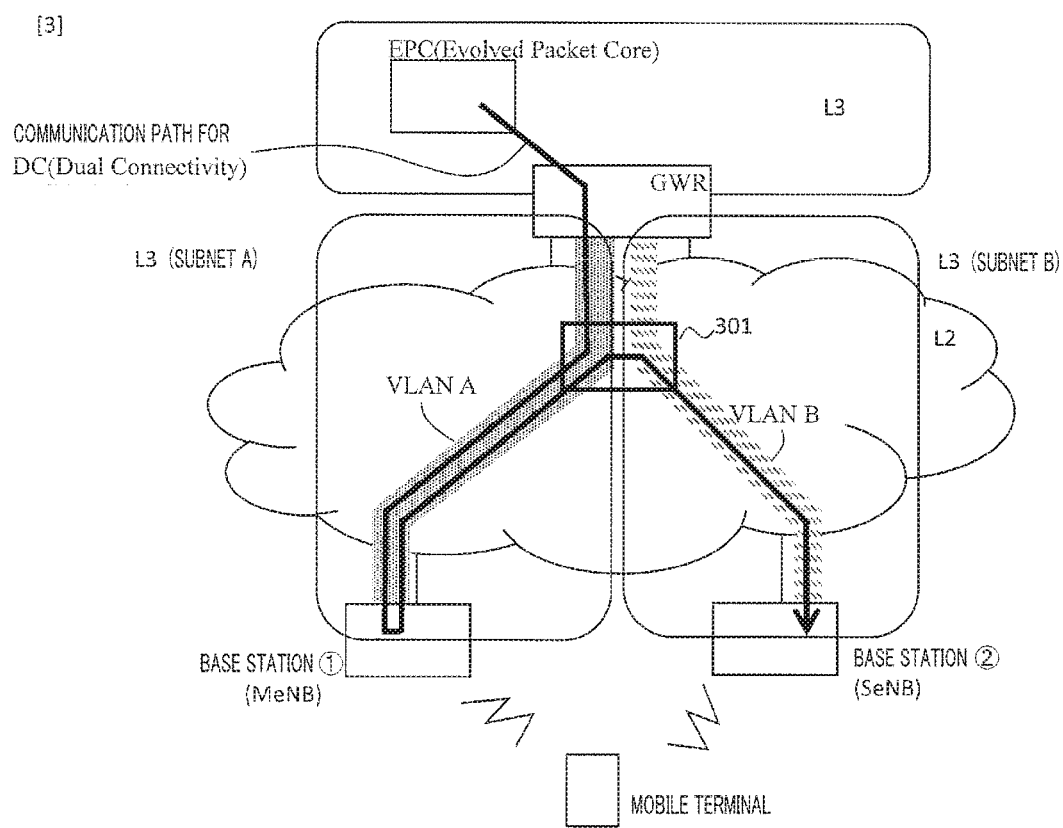
FIG. 3 is a diagram illustrating a communication system that includes a communication device according to the present invention.
Figure 4:
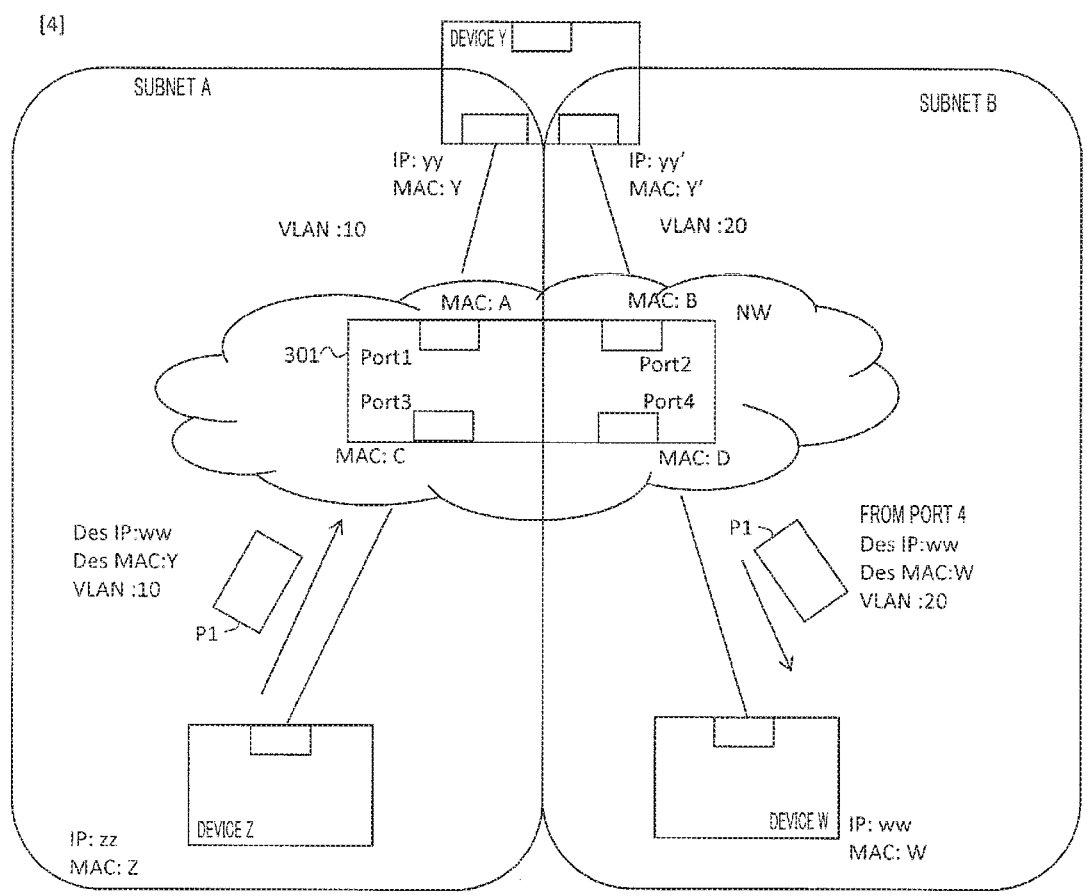
FIG. 4 is a diagram illustrating operations of the communication device according to the present invention.

FIG. 3 is a diagram illustrating a communication system that includes a communication device 301 according to this embodiment and implements Dual Connectivity. FIG. 4 is a diagram illustrating operations of the communication device 301. In FIG. 4 and the subsequent figures, "DesIP:" means an IP address (an address in the L3 layer) of the destination of a transfer packet P1, and "DesMAC:" means a MAC address (an address in the L2 layer) of the destination of the transfer packet P1.

The communication device 301 is a communication device that includes a plurality of communication ports and enables a communication packet to be transferred between different communication domains, and the communication device 301 includes:

a setting table 51 for setting, for each of the communication ports, a communication domain to which each of the communication ports belongs and a transfer destination address of a communication packet in each communication layer; and a path change unit 52 that, when a communication port receives a transfer packet, reads, from the transfer packet, transmission destination addresses and transmission destination communication domains in a highest communication layer that is highest and a lower communication layer that is lower than the highest communication layer, reads out, from the setting table 51, an address and a communication domain in the lower communication layer that correspond to the transmission destination address in the highest communication layer, and, if the address in the lower communication layer read out from the setting table 51 differs from the transmission destination address in the lower communication layer of the transfer packet, overwrites the transmission destination address and the communication domain in the lower communication layer of the transfer packet with the address and the communication domain in the lower communication layer read out from the setting table 51, and changes a path for transmitting the transfer packet from a communication port that corresponds to the address and the communication domain in the lower communication layer read out from the setting table 51.

Figure 5:
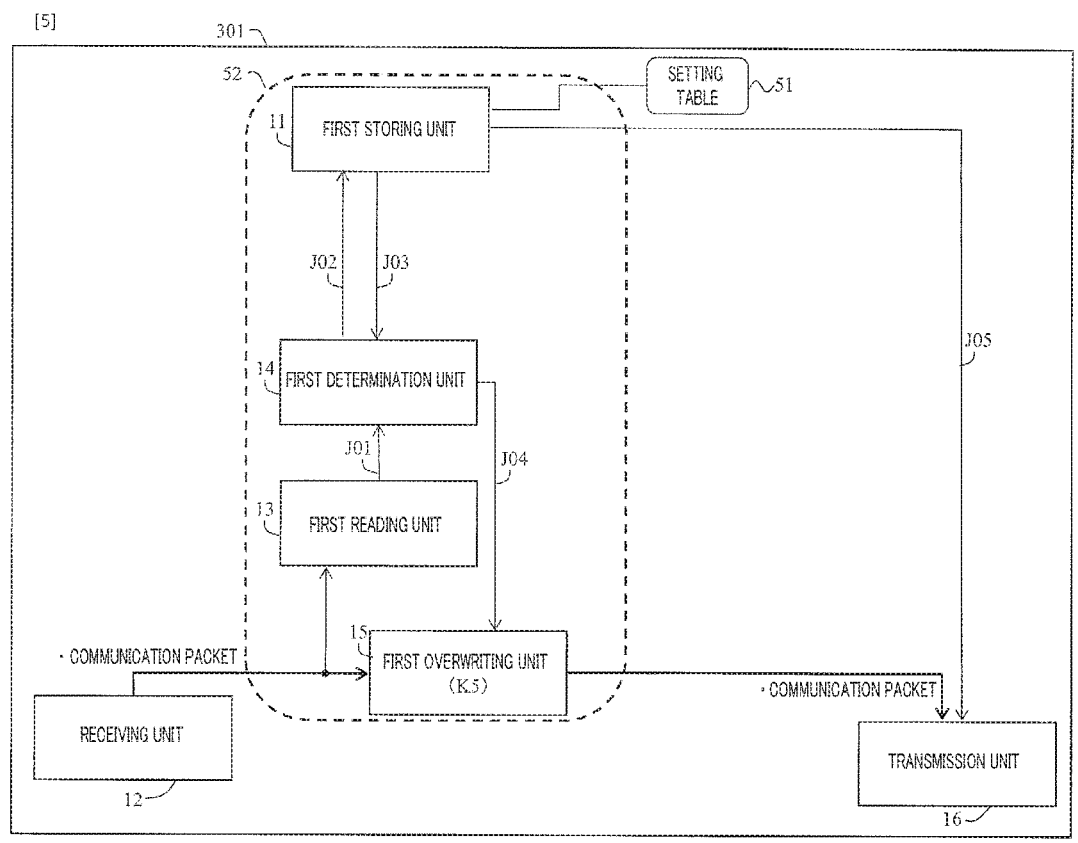
FIG. 5 is a diagram illustrating the communication device according to the present invention.

FIG. 5 is a block diagram illustrating functions of the communication device 301. The communication device 301 is a communication device with communication ports that belong to different communication domains, and has:

a first storing unit 11 that stores a set of an address in each communication layer that is to be used in transmission to other communication devices belonging to each communication domain, communication domain, and a value indicating a communication port of the device that is to be used in transmission;

a receiving unit 12 that receives a communication packet;

a first reading unit 13 that reads a transmission destination address and a communication domain in each communication layer in the received communication packet;

a first determination unit 14 that references an address part in each layer that is lower than a predetermined first communication layer in the address set obtained by the first storing unit 11, based on the transmission destination address in the first communication layer obtained by the first reading unit 13, determines that overwriting is allowed if the address part differs from the transmission destination address obtained by the first reading unit 13, and determines that overwriting is not allowed if the address part is the same as the transmission destination address obtained by the first reading unit 13;

a first overwriting unit 15 that, if it is determined by the first determination unit 14 that the overwriting is allowed, overwrites values of the transmission destination address and the communication domain in each layer that is lower than the first communication layer in the communication packet, with values of a transmission destination address and a communication domain in each layer that is lower than the first communication layer obtained by the first storing unit 11; and a transmission unit 16 that transmits the communication packet from a communication port obtained by the first storing unit 11 based on a transmission destination address in a predetermined second communication layer that is lower than the first communication layer in the communication packet.

Note that the first storing unit 11 may be configured to store values that are to be stored in the setting table 51. The path change unit 52 corresponds to the first storing unit 11, the first reading unit 13, the first determination unit 14, and the first overwriting unit 15.

Information transmitted between the functional blocks is as follows:

J01: a pair of a transmission destination address and a communication domain in each communication layer that are read out from a communication packet;

J02: a transmission destination address and a communication domain in the first communication layer that are read out from the communication packet;

J03: a set of an address and a communication domain in each communication layer lower than the first communication layer, the set being stored in association with the transmission destination address and the communication domain in the first communication layer read out from the communication packet;

J04: whether or not overwriting is allowed: if overwriting is allowed, the address and the communication domain in each communication layer lower than the first communication layer that are obtained from the first storing unit 11; and J05: the communication domain read out from the communication packet, and a communication port to be used in transmission stored in association with the transmission destination address in the first communication layer.

An operation performed by the first overwriting unit 15 is as follows:

K01: if overwriting is allowed, the transmission destination address and the communication domain in each communication layer lower than the first communication layer of the communication packet are overwritten with the address and the communication domain obtained by the first determination unit 14.

Figure 6:
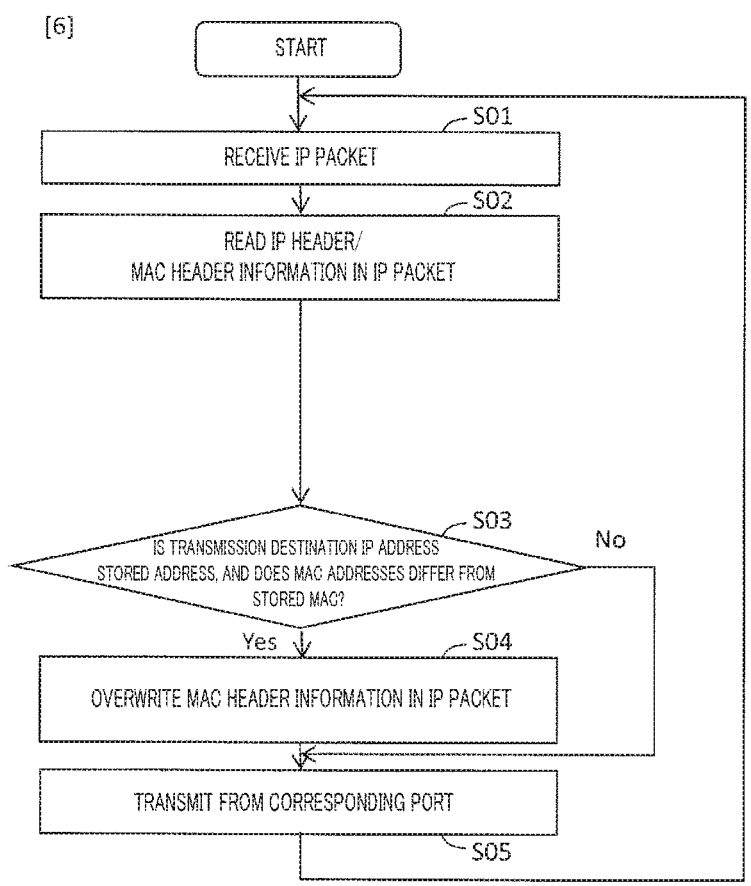
FIG. 6 is a sequence chart illustrating a communication method according to the present invention.

FIG. 6 is a sequence chart illustrating operations of the communication device 301. To enable a communication packet to be transferred between different communication domains, the communication device 301 that includes a plurality of communication ports uses the setting table 51 in which a communication domain to which each of the communication ports belongs and a destination address to which the communication packet is to be transferred in each communication layer, are set for each communication layer.

When a communication port receives a transfer packet (step S01), the communication device 301 reads, from the transfer packet, transmission destination addresses and transmission destination communication domains in a highest communication layer that is highest and a lower communication layer that is lower than the highest communication layer (step S02).

The communication device 301 reads out, from the setting table 51, an address and a communication domain in the lower communication layer that correspond to the transmission destination address in the highest communication layer.

If the address in the lower communication layer read out from the setting table 51 differs from the transmission destination address in the lower communication layer of the transfer packet (Yes in step S03), the communication device 301 overwrites the transmission destination address and the communication domain in the lower communication layer of the transfer packet with the address and the communication domain in the lower communication layer read out from the setting table 51 (step S04), and transmits the transfer packet from a communication port that corresponds to the address and the communication domain in the lower communication layer read out from the setting table 51 (step S05).

In the communication device 301, a setting is made regarding IP/MAC addresses, other communication devices with which respective ports of the communication device 301 are connected to, and subnet/VLAN IDs associated with these connections. For example, the communication device 301 may have a setting table shown in FIG. 19.

The first reading unit 13 reads out a transmission destination IP address and MAC address in the received communication packet (step S02, J01). The first determination unit 14 determines, based on this IP address, whether or not the MAC address stored in the communication device 301 differs from the transmission destination MAC address of the communication packet (step S03, J02, J03). If these MAC addresses differ from each other ("Yes" in step S03), the first overwriting unit 15 overwrites the destination MAC address of this communication packet with the MAC address stored in the communication device 301 (step S04, J04, K01). Then, the transmission unit 16 transmits the communication packet from the VLAN ID and the port associated with the destination MAC address that has been overwritten in the setting table in FIG. 19 (step S05, J05). Note that if the MAC addresses do not differ from each other in the above determination regarding whether the transmission destination MAC addresses differ from each other ("No" in step S03), the first overwriting unit 15 does not overwrite the destination MAC address, and the transmission unit 16 transmits the communication packet in accordance with the destination MAC address of the communication packet.

Embodiment 2

Embodiment 1 has described a mode of only using an L2 protocol, whereas, here, a mode of also using a protocol that is higher than L2, such as a VxLAN, will be described. If a communication packet P1 is encapsulated within a higher protocol such as a VxLAN, not only header information in L2 but also the encapsulated header information needs to be overwritten.

Figure 7:
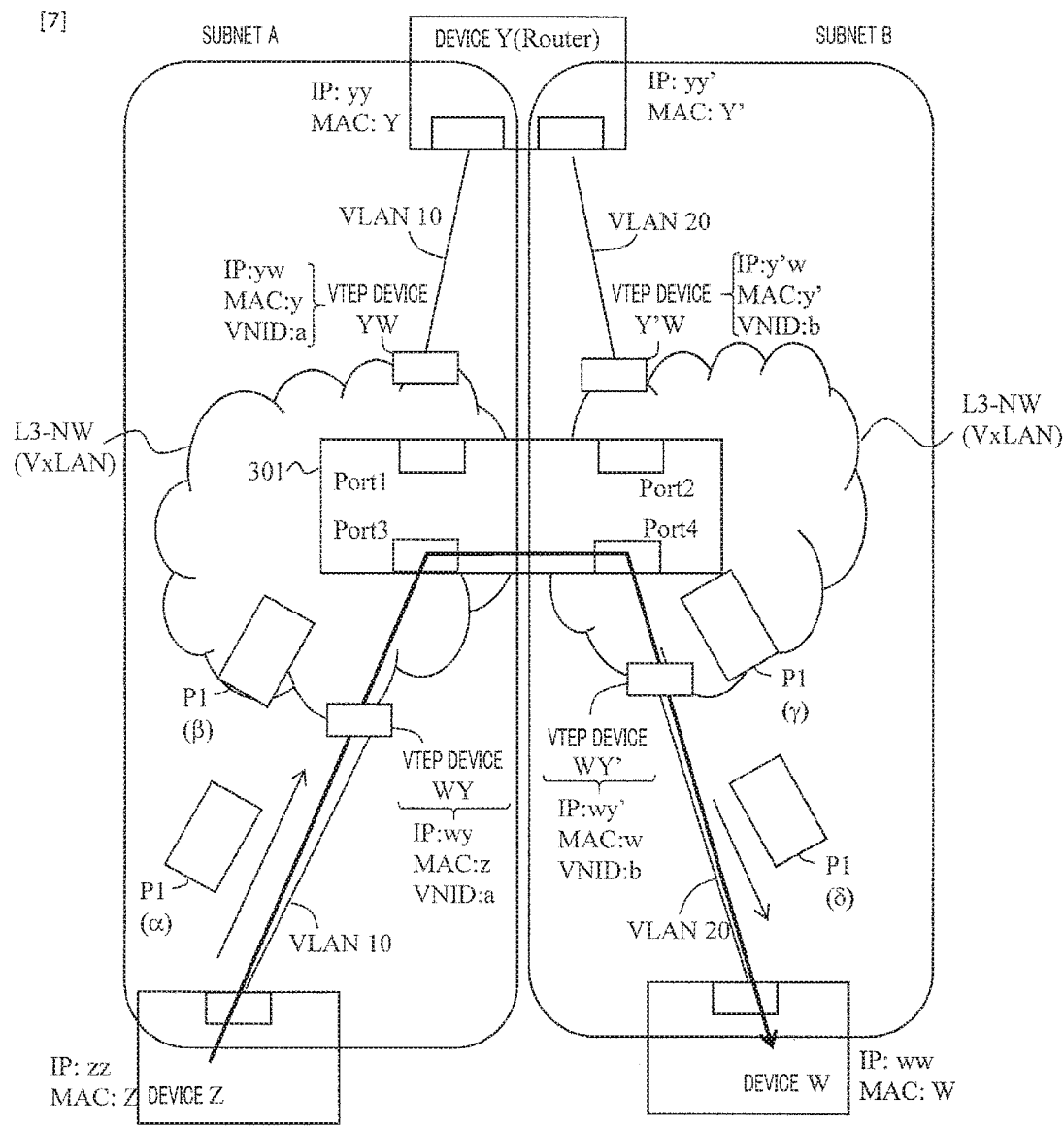
FIG. 7 is a diagram illustrating operations of the communication device according to the present invention.

FIG. 7 is a diagram illustrating an example of the case of encapsulating L2 using the VxLAN (L3) protocol. An L3 network (VxLAN) is formed in each subnet, and a VTEP device is disposed at an input-output part of each L3 network. A domain, an IP address, and a MAC address are assigned to each VTEP device.

FIG. 20 shows a setting table that the communication device 301 according to this embodiment has. FIG. 21 shows a table illustrating Header information in each communication zone of the communication packet P1 to be transferred. The first overwriting unit 15 overwrites not only L2 Header but also VxLAN Header, for the communication zone y. By thus overwriting L3 and VxLAN Header information, a desired operation can be realized.

Although encapsulation using a VxLAN has been taken as an example here, the same applies to other communication protocols such as MPLS-TP.

Embodiment 3

Embodiment 1 has described a mode in which information such as the table in FIG. 19 is statically preset in advance, for example, and thus stored in the communication device 301, whereas, here, a mode in the case of dynamically learning the table in FIG. 19 based on a communication packet that is communicated between the communication device 301 and other devices will be described.

Compared with the communication device 301 in FIG. 5, a communication device 302 further includes:

an updating unit 53 that, when a transfer packet is received, reads, from the transfer packet, the transmission source addresses and the transmission source communication domains in the highest communication layer and the lower communication layer, and, if the addresses and the communication domains for the communication port that has received the transfer packet differ from addresses and communication domains written in the setting table 51, updates the setting table 51 such that the transmission source addresses and the transmission source communication domains in the highest communication layer and the lower communication layer read from the transfer packet are described as the addresses and the communication domains for the communication port that has received the transfer packet.

Figure 8:
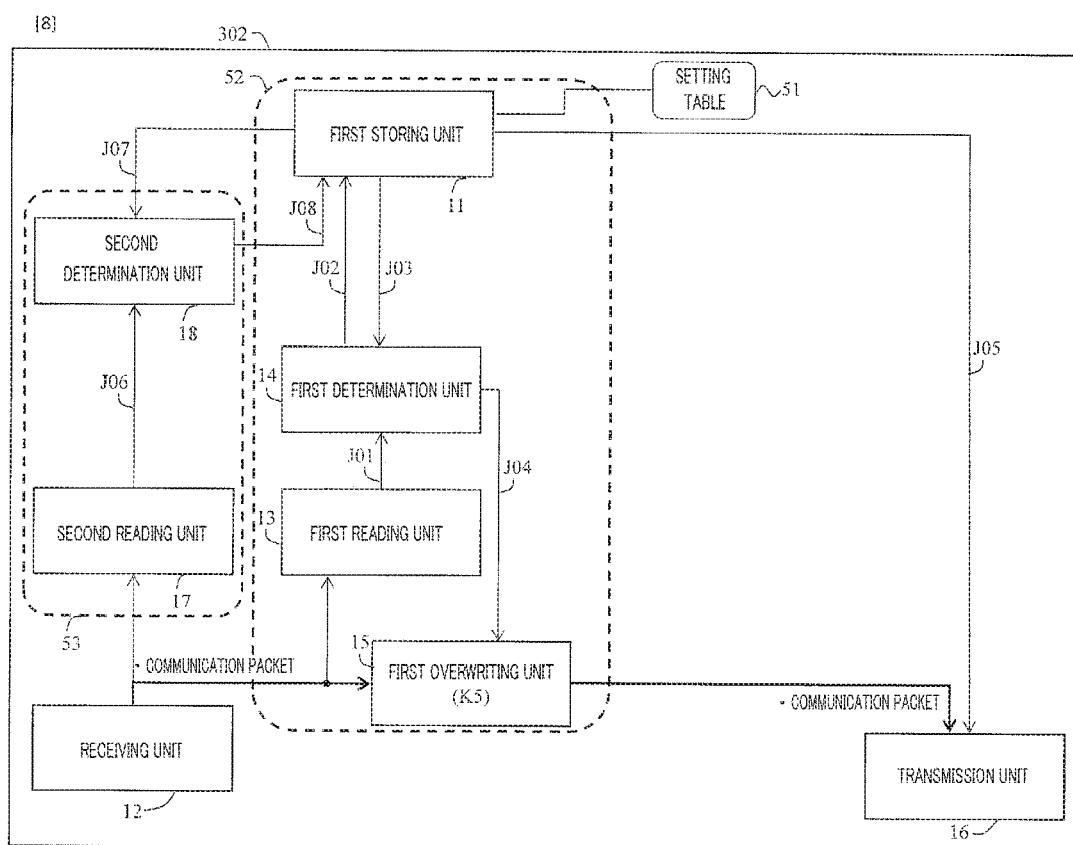
FIG. 8 is a diagram illustrating the communication device according to the present invention.

FIG. 8 is a block diagram illustrating functions of the communication device 302. Compared with the communication device 301 in FIG. 5, the communication device 302 further includes a second reading unit 17 and a second determination unit 18 in the updating unit 53.

The second reading means 17 reads a transmission source address and a communication domain in each communication layer of the received packet, and the communication port that has received the packet.

The second determination unit 18 compares information J06 read by the second reading means 17 with information indicating the address and the communication domain in each communication layer, and the communication port stored in the first storing means 11, and updates the information indicating the address, the communication domain, and the communication port stored in the first storing means 11 if the compared information differs or is not stored.

Specifically, the second reading unit 17 reads a communication layer, a transmission source address or a communication domain thereof, of the received communication packet, and the communication port that has received the communication packet. The read information is compared, by the second determination unit 18, with past learning results stored in the setting table 51 by the first storing unit 11. If, as a result of comparison, the read information is information that has not been learned in the past, the second determination unit 18 causes the first storing unit 11 to newly write the read information in the setting table 51. If the read information differs from the past learning results, the second determination unit 18 causes the first storing unit 11 to overwrite information in the setting table 51.

Compared with the communication device 301 in FIG. 5, new information that is transmitted between the functional blocks in the communication device 302 is as follows:

J6: a set of a communication layer, a transmission source address, a communication domain, and a communication port that are read out from a communication packet;

J7: a set of a communication layer, an address, a communication domain, and a communication port that are stored in the setting table 51; and J8: if different from information that was stored in the past in the setting table 51, a set of a communication layer, an address, a communication domain, and a communication port that are newly obtained.

Figure 9:
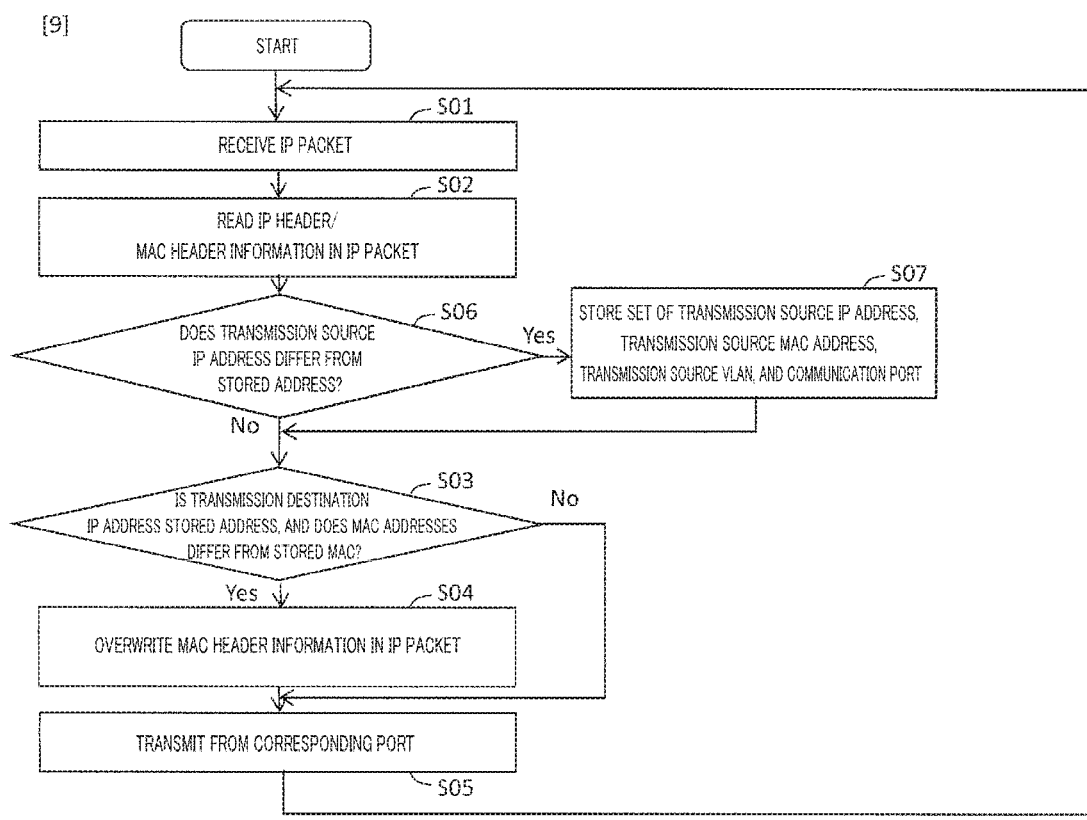
FIG. 9 is a sequence chart illustrating a communication method according to the present invention.

FIG. 9 is a sequence chart illustrating operations of the communication device 302. Compared with the sequence chart of the communication device 301 in FIG. 6, the sequence chart according to this embodiment additionally includes a process (step S06) of determining whether or not a transmission destination IP address differs from a stored address, and a process (step S07) of storing a set of a transmission source IP address, a transmission source MAC address, a transmission source VLAN, and a communication port.

Compared with the communication device 301, operations that the communication device 302 newly performs are as follows. The second reading unit 17 reads a communication layer, a transmission source address or a communication domain thereof in the received communication packet, and the communication port that has received the communication packet (step S02). The second determination unit 18 compares the information J06 read by the second reading unit 17 with the past learning information J07 stored in the setting table 51 by the first storing unit 11 (step S06). If, as a result of comparison, the information J06 is the same as the information J07, the first determination unit 14 performs step S03 as described in FIG. 6. On the other hand, if the information J06 is not the same as the information J07, the second determination unit 18 causes the first storing unit 11 to newly write the information J06 in the setting table 51, or to overwrite information in the setting table 51.

Thus, information such as the table in FIG. 19 can be stored through learning, without statically making a setting, in advance, on the communication device 301.

Embodiment 4

Figure 10:
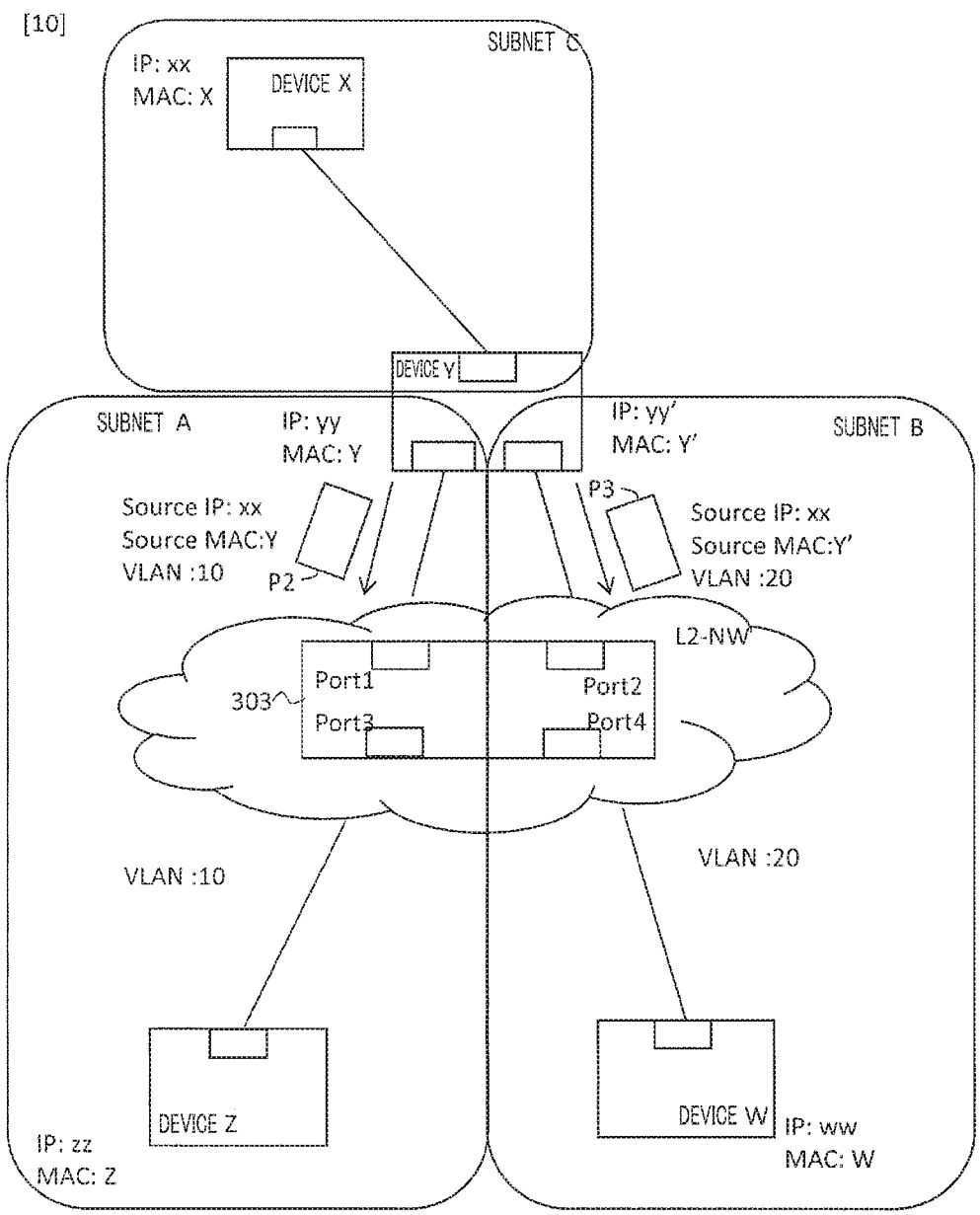
FIG. 10 is a diagram illustrating operations of the communication device according to the present invention.

This embodiment will describe an example in which a device Y (router) communicates with devices in subnets A and B as well as a device x in a subnet C to which the device Y is connected, as shown in FIG. 10. In this embodiment, first, in the communication from a device z to a device w, the destination of a packet is overwritten using learned information, and the packet is transferred, as described in Embodiment 3. Thus, suppression of an increase and a decrease in the communication band can be realized. The following description will be given of a problem that may occur if the packet destination is attempted to be overwritten to transfer the packet based on the learned information in the communication from the device z to the device x.

For example, if communication is performed from the device x to the device z and the device w, a communication device 303 receives, at a port 1, a communication packet P2 with a transmission source IP address xx, a transmission source MAC address Y, and a VLAN 10, and receives, at a port 2, a communication packet P3 with a transmission source IP address xx, a transmission source MAC address Y', and a VLAN 20. Since the communication device 302 according to Embodiment 3 operates as shown in the block diagram illustrated in FIG. 8 and the sequence chart in FIG. 9, the communication device 302 performs learning in accordance with the received communication packet, and creates a setting table in FIG. 22.

In this case, two MAC addresses, namely Y and Y' are learned as MAC addresses for the IP address xx, as in the setting table in FIG. 22. If communication from the device z to the device x is performed in this state, there is concern that the communication device 302 will not know whether the MAC address is to be overwritten with Y or Y', and will not be able to normally transfer the packet. This state may be entered if processing in L3 is performed by an L3 switch or the like between a transfer device and a transmission source device (in FIG. 10, processing in L3 performed by the device Y), and the transmission source IP address and the transmission source MAC address do not coincide.

To avoid such a situation, the packet may be transferred without overwriting the destination of the packet. Specifically, a set of information indicating whether or not overwriting allowed and an IP address may be set as a list, in advance, for the communication device 303, and the communication device 303 may perform an operation to determine whether or not overwriting is to be carried out.

Compared with the communication device 302 in FIG. 8, the communication device 303 further includes:

an exception setting unit in which a combination is described in advance, the combination being constituted by at least one of a specific communication port, an address in a specific communication layer, and a specific communication domain, or by at least two of the specific communication port, the address in the specific communication layer, and the specific communication domain; and a function of not allowing the path change unit to change the path if a combination is described in the exception setting unit, the combination being constituted by at least one of the communication port that has received the transfer packet, the communication port for transmitting the transfer packet, a transmission source address in one of the communication layers read from the transfer packet, a transmission destination address in one of the communication layers read from the transfer packet, a communication domain to which a transmission source communication device of the transfer packet belongs, and a communication domain to which a transmission destination communication device of the transfer packet belongs, or by at least two of the communication port that has received the transfer packet, the communication port for transmitting the transfer packet, the transmission source address in the one of the communication layers read from the transfer packet, the transmission destination address in the one of the communication layers read from the transfer packet, the one of the communication domains to which the transmission source communication device of the transfer packet belongs, and the one of the communication domains to which the transmission destination communication device of the transfer packet belongs.

Figure 11:
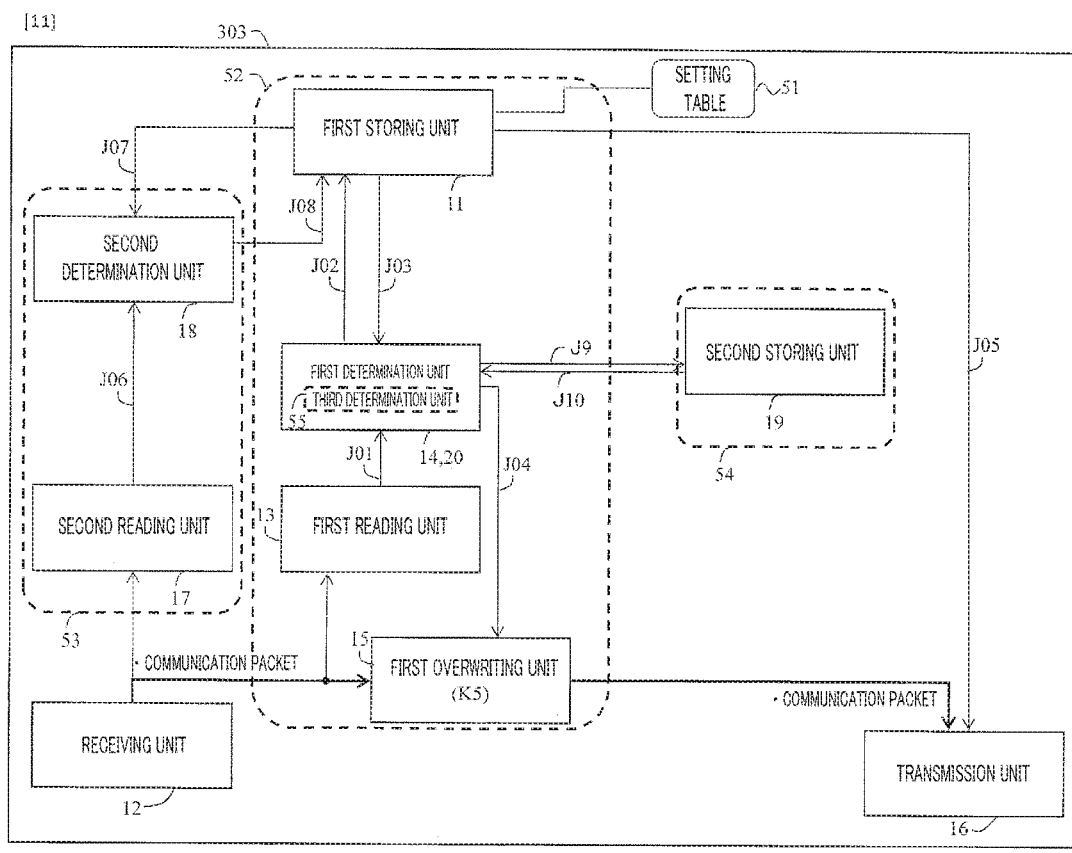
FIG. 11 is a diagram illustrating the communication device according to the present invention.

FIG. 11 is a block diagram illustrating functions of the communication device 303 according to this embodiment. Compared with the communication device 302 in FIG. 8, the communication device 303 further includes a second storing unit 19, which is the exception setting unit 54, and a third determination unit 20, which is the function 55 for not allowing a path to be changed.

The second storing unit 19 stores whether or not first overwriting may be carried out with respect to one of or a combination of, one of or a combination of a transmission source address and a transmission destination address in each communication layer, or one of or a combination of a communication domain in each communication layer to which the transmission source communication device of the communication packet belongs and a communication domain to which the transmission destination communication device of the communication packet belongs, or one of or a combination of a port that has received the communication packet and a port for transmitting the communication packet in this communication device.

The first determination unit 14 of the third determination unit 20 references information indicating whether or not overwriting is allowed stored in association with the address, the communication domain, and the communication port stored by the second storing unit 19, with respect to the transmission source address and the communication domain in the first communication layer in the information obtained by the first reading unit 13, or with respect to the transmission destination address and the communication domain in the first communication layer obtained by the second reading unit 17, and determines whether or not overwriting is allowed.

If the third determination 20 determines that overwriting is not allowed to be carried out, the first overwriting unit 15 transmits, without performing the K5 operation, the communication packet from a communication port with the communication domain obtained by the second storing unit 19 based on a transmission destination address in the lowest communication layer in the communication packet that can be handled by the communication device.

Compared with the communication device 302 in FIG. 8, new information that is transmitted between the functional blocks in the communication device 303 is as follows:

J9: a set of a transmission destination address and a transmission source address in the first communication layer that are read out from a communication packet, or the like; and J10: whether or not overwriting is allowed.

Figure 12:
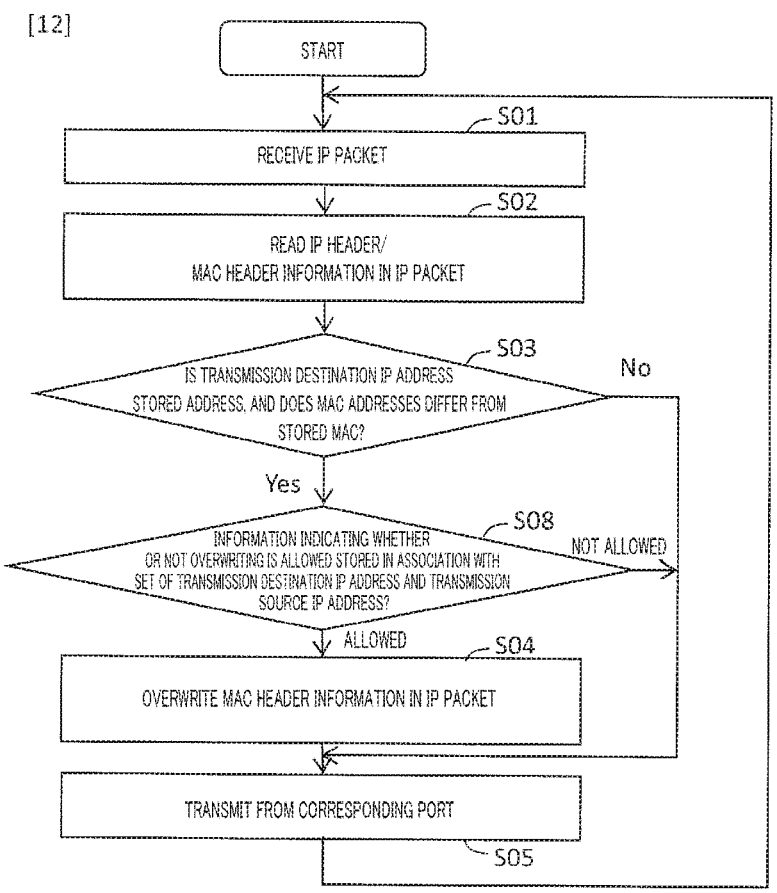
FIG. 12 is a sequence chart illustrating a communication method according to the present invention.

FIG. 12 is a sequence chart illustrating operations of the communication device 303. Compared with the sequence chart of the communication device 301 in FIG. 6, the sequence chart in FIG. 12 additionally includes a process (step S08) of checking information indicating whether or not overwriting is allowed stored in association with a set of a transmission destination IP address and a transmission source IP address.

For example, in the example in FIG. 10, the second storing unit 19 can be made to remember that overwriting may be carried out for communication from an IP address zz to an IP address ww, but overwriting is not carried out for communication from the IP address zz to an IP address xx. Thus, the third determination unit 20 determines to not overwrite the address with respect to a packet from the device z to the device x (i.e. not allow the first overwriting unit 15 to perform the K5 operation), and accordingly, the communication device 303 can transfer the packet only from the port 1 that is connectable within the same VLAN.

Although an example has been described here in which whether or not overwriting is allowed is determined based on a set of the transmission source and transmission destination IP addresses, it is also conceivable to make the determination only based on the transmission source IP address or only based on the transmission destination IP address. An example is also conceivable in which the determination is made based on not only an IP address, but also an address in another communication layer, such as a MAC address. An example of making the determination based on a communication domain such as a VLAN, and an example of making the determination based on a communication port are also conceivable.

Embodiment 5

This embodiment will describe an example in which a packet is a multicast packet. If an IP multicast packet P4 is input to a communication device 304, two patterns of operations of the communication device 304 are envisioned: that is, the case of multicasting the IP multicast packet P4 to ports in a VLAN to which a transmission source device belongs (FIG. 13); and the case of multicasting the IP multicast packet P4 to all connected ports (FIG. 14).

Figure 13:
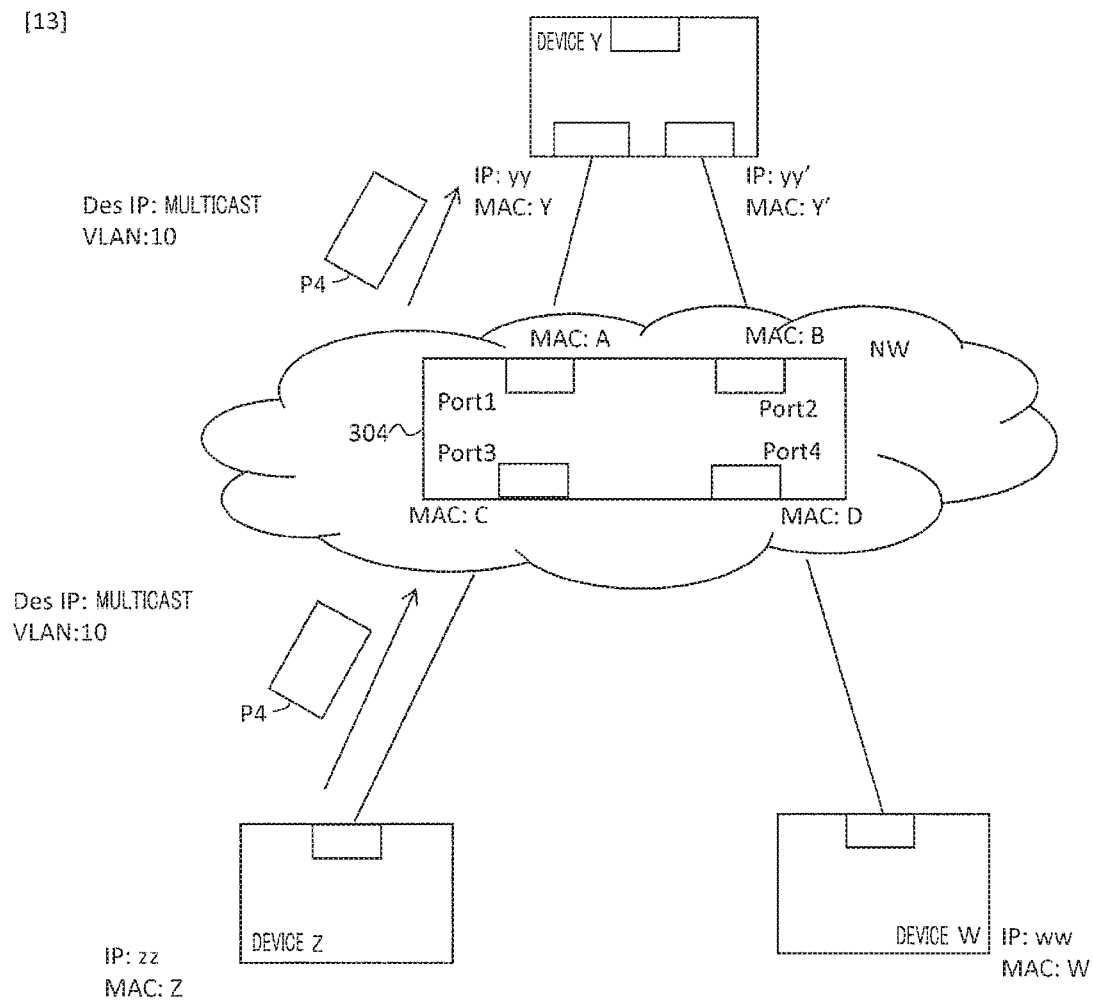
FIG. 13 is a diagram illustrating operations of the communication device according to the present invention.
Figure 14:
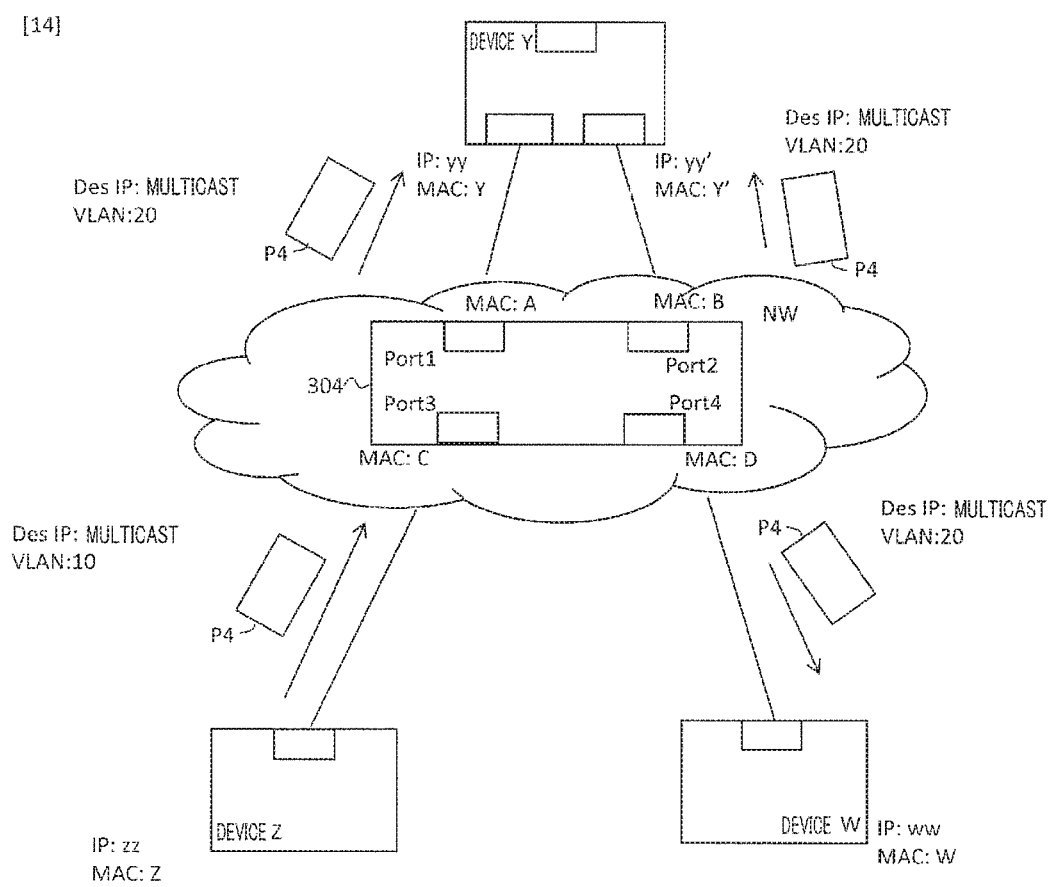
FIG. 14 is a diagram illustrating operations of the communication device according to the present invention.

Here, if multicast communication is performed for different VLANs as shown in FIG. 14, a plurality of the same frames may be delivered to a device Y or the like, depending on the area for an IP multicasting group, and therefore, such multicast communication is to be avoided from the viewpoint of efficient use of the communication band. For this reason, an operation to multicast the packet only within the VLAN to which the transmission source device belongs, as shown in FIG. 13, is preferable.

The communication device 304 further includes a function of not allowing the path change unit 52 to change the path if the transmission destination address in the highest communication layer read from a received transfer packet is a multicast packet.

Whether or not the received packet is an IP multicast packet can be determined by identifying whether or not the destination IP address is a multicast address.

If it is identified that the received packet P4 is a multicast address, the first determination unit 14 makes a setting, in advance, on the first overwriting unit 15 so as not to perform overwriting, and thus, the communication device 304 will multicast the packet only within the VLAN to which the transmission source device of the packet P4 belongs.

Embodiment 6

Figure 15:
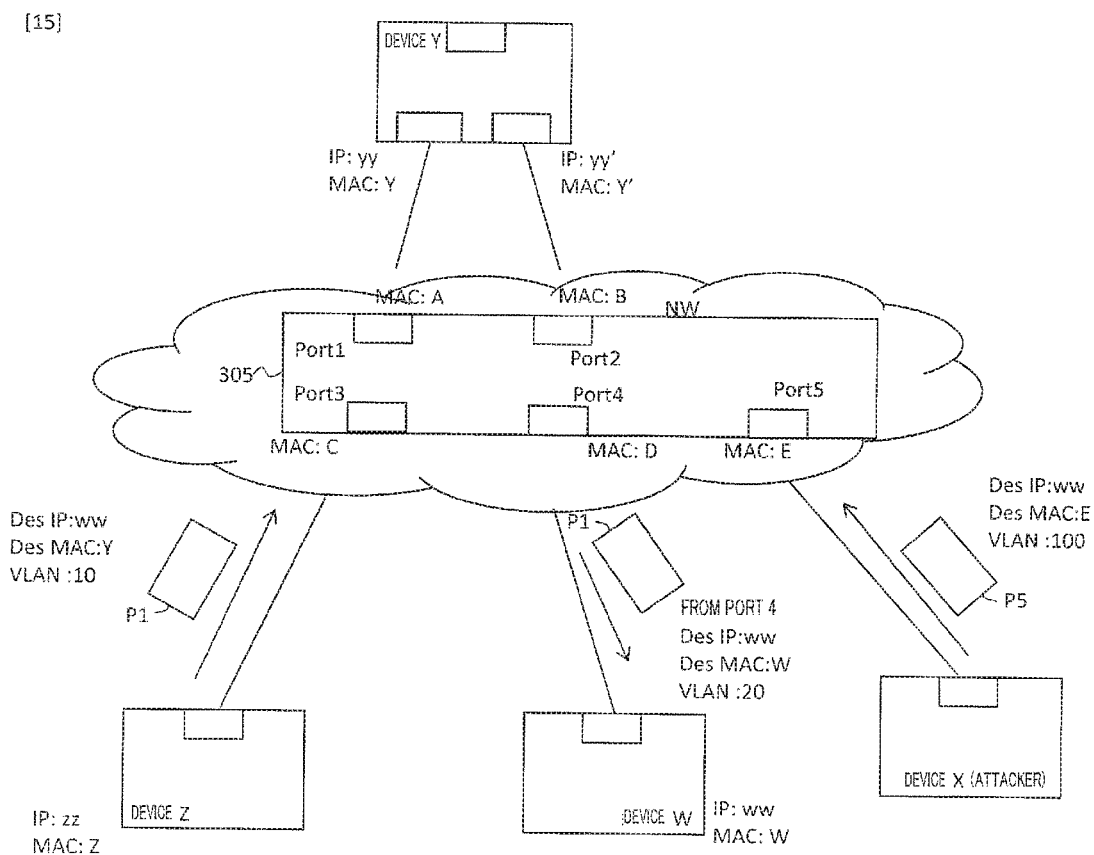
FIG. 15 is a diagram illustrating operations of the communication device according to the present invention.

FIG. 15 is a diagram illustrating a situation in this embodiment. If a communication device 305 performs an operation similar to that of the communication device 301 in Embodiment 1, not only a device Z but also a device X that belongs to another VLAN can communicate with a device W. For this reason, the case is conceivable where communication from the device X, which is a malicious attacker, to the device W wants to be interrupted.

For example, to interrupt the communication, it is conceivable to identify the VLAN to which a transmission source device belongs, and determine whether or not communication is allowed. In the case in FIG. 15, communication may be only allowed for communication packets transmitted from devices that belong to a VLAN 10. In the description here, whether or not communication is allowed is determined based on the VLAN to which a transmission source device belongs. However, the determination may be made based on the pair of VLANs of the transmission source and transmission destination devices (e.g. transmission is allowed for the pair of transmission source: VLAN 10 and transmission destination: VLAN 20). Alternatively, the determination may be made based on a device address, rather than the VLAN.

Figure 16:
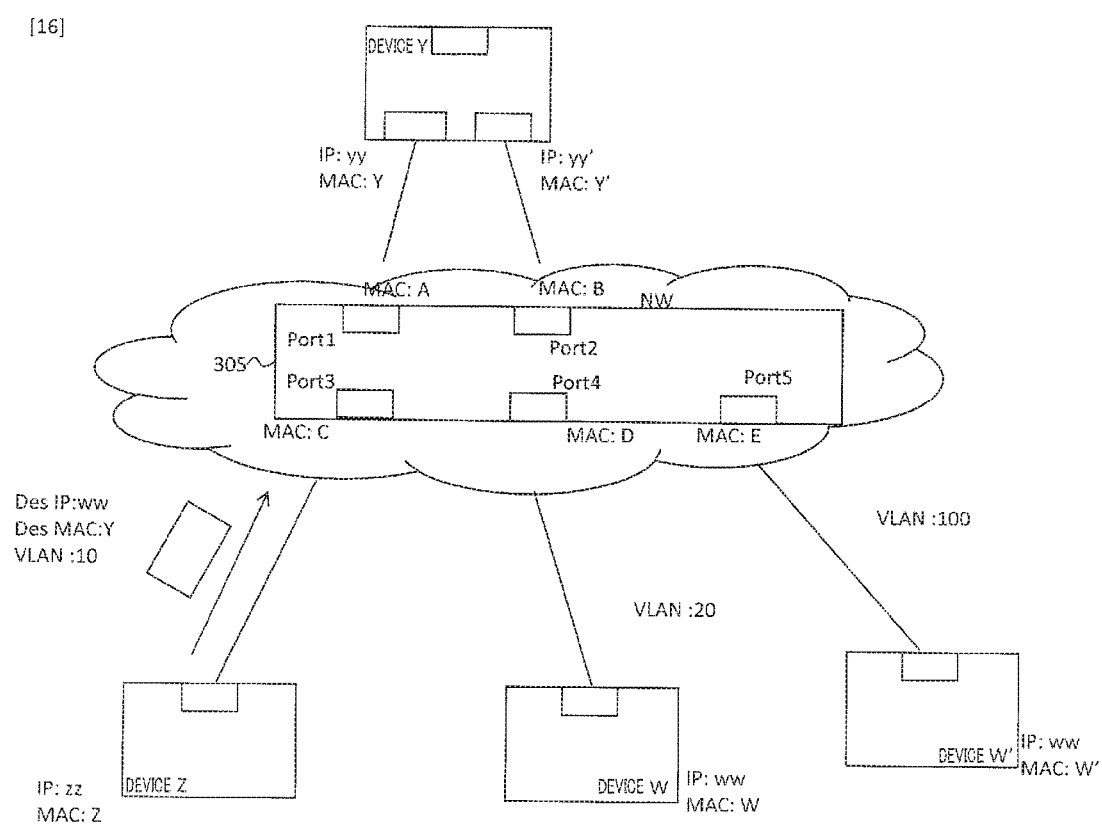
FIG. 16 is a diagram illustrating operations of the communication device according to the present invention.

FIG. 16 is a diagram illustrating another situation in this embodiment. There may be cases where the same IP address is assigned to a plurality of VLANs that are connected to the communication device 305 (in the example in FIG. 16, an IP address ww is assigned to both a device W and a device W'). In such cases, when transmission is attempted from the device Z to the IP address ww, the communication device 305 cannot determine which of the device W and the device W' to communicate with. To avoid this situation, it is conceivable that the communication device 305 determines whether or not communication is allowed, based on the VLAN or the device address, as mentioned above.

Compared with the communication device 303 in FIG. 11, the communication device 305 includes:

an interruption target setting unit 56 in which a combination is described in advance, the combination being constituted by at least one of a specific communication port, an address in a specific communication layer, and a specific communication domain, or by at least two of the specific communication port, the address in the specific communication layer, and the specific communication domain; and a function 57 of not allowing the path change unit 52 to transmit the transfer packet if a combination is described in the interruption target setting unit 56, the combination being constituted by at least one of the communication port that has received the transfer packet, the communication port for transmitting the transfer packet, a transmission source address in one of the communication layers read from the transfer packet, a transmission destination address in one of the communication layers read from the transfer packet, a communication domain to which a transmission source communication device of the transfer packet belongs, and a communication domain to which a transmission destination communication device of the transfer packet belongs, or by at least two of the communication port that has received the transfer packet, the communication port for transmitting the transfer packet, the transmission source address in the one of the communication layers read from the transfer packet, the transmission destination address in the one of the communication layers read from the transfer packet, the one of the communication domains to which the transmission source communication device of the transfer packet belongs, and the one of the communication domains to which the transmission destination communication device of the transfer packet belongs.

Figure 17:
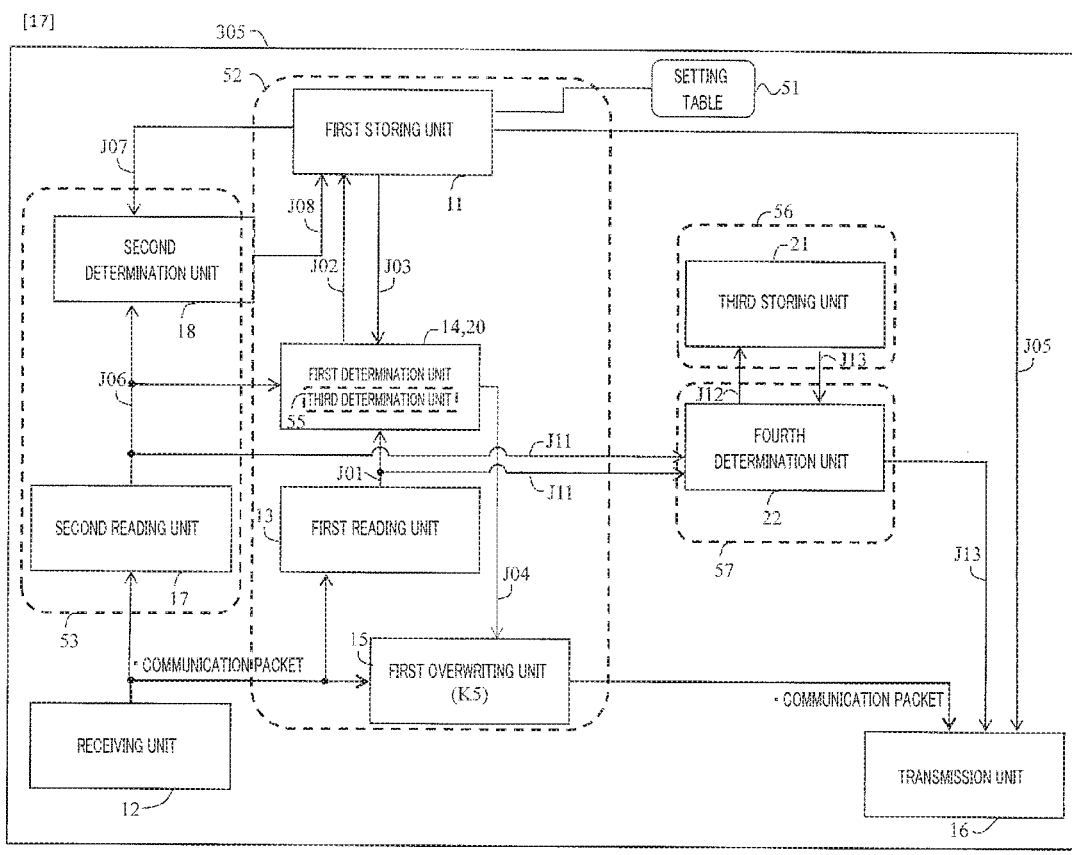
FIG. 17 is a diagram illustrating the communication device according to the present invention.

FIG. 17 is a block diagram illustrating functions of the communication device 305 according to this embodiment. Compared with the communication device 303 in FIG. 11, the communication device 305 includes a third storing unit 21, which is the interruption target setting unit, and a fourth determination unit 22, which is a function of not allowing a transfer packet to be transmitted, and does not include the second storing unit 19.

The third storing unit 21 stores information indicating whether or not communication is allowed, with respect to one of or a combination of, one of or a combination of a transmission source address and a transmission destination address in each communication layer, or one of or a combination of a communication domain in each communication layer to which the transmission source communication device of the communication packet belongs and a communication domain to which the transmission destination communication device of the communication packet belongs, or one of or a combination of a port that has received the communication packet and a port for transmitting the communication packet in this communication device.

The fourth determination unit 22 references information indicating whether or not communication is allowed stored in association with the address, the communication domain, and the communication port obtained by the third storage means 21, with respect to a transmission source address and a communication domain in the second communication layer obtained by the first reading unit 13, or with respect to a transmission source address and a communication domain in the second communication layer obtained by the second reading unit 17, and determines whether or not communication is allowed.

The transmission unit 16 does not transmit the communication packet for which the fourth determination unit 22 determines that communication is not allowed.

Compared with the communication device 303 in FIG. 11, new information that is transmitted between the functional blocks in the communication device 305 is as follows:

J11: a pair of a transmission destination address and a communication domain in each communication layer that are read out from the communication packet;

J12: a set of a transmission destination address and a transmission source address in the first communication layer that are read out from the communication packet, or the like; and J13: whether or not transmission is allowed.

Figure 18:
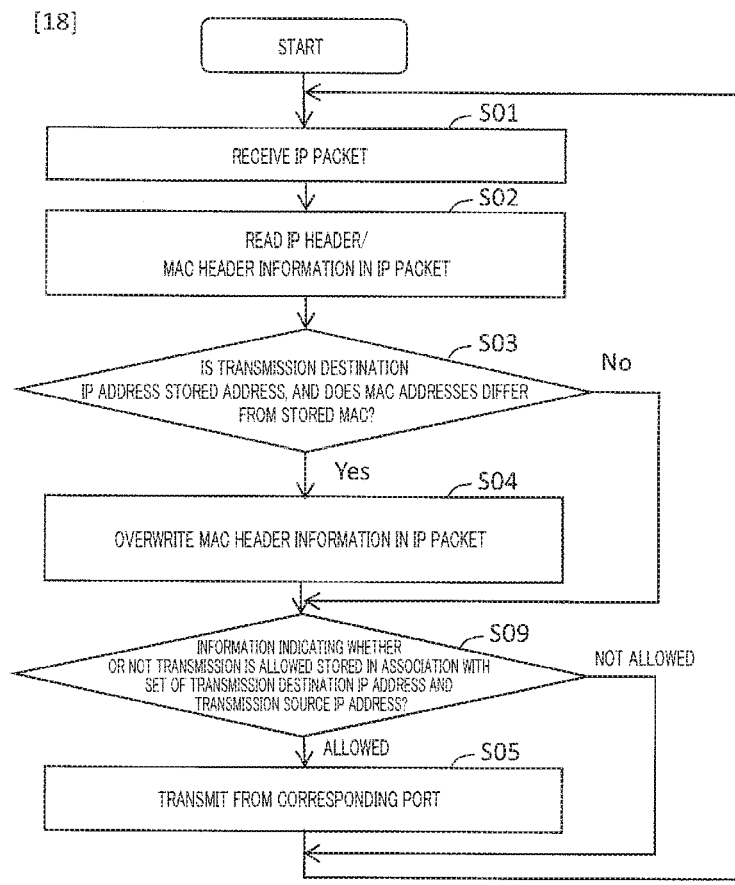
FIG. 18 is a sequence chart illustrating a communication method according to the present invention.

FIG. 18 is a sequence chart illustrating operations of the communication device 305. Compared with the sequence chart of the communication device 301 in FIG. 6, the sequence chart in FIG. 18 additionally includes a process (step S09) of determining whether or not to transmit a communication packet based on information indicating whether or not transmission is allowed stored in association with a set of a transmission source IP address and a transmission destination IP address.

Although this embodiment has described the communication device 305 that does not include the second storing unit 19, the communication device 305 may also include the second storing unit 19 that has been described regarding the communication device 303 according to Embodiment 4. That is to say, in the case where the communication device 305 includes the second storing unit 19, the communication device 305 also performs the operations described regarding the communication device 303 according to Embodiment 4. Thus, the embodiments describe examples of the communication device according to the present invention, and functions described in the embodiments may be combined.

SUPPLEMENTARY NOTES

The following description is of the communication device according to this embodiment.

An object of the present invention is to insert the communication device 301 into an L2-NW as shown in FIG. 3, for example, change the destination of a communication packet within the communication device 301, and enable communication to be performed between base stations through a path that is shorter than conventional paths.

The present invention eliminates the necessity for making an additional setting on the base stations to solve the problem that the communication band is excessively consumed due to communication via a GWR, and makes it possible to solve the problem that the setting operation requires long time in the case where the number of base stations is very large.

REFERENCE SIGNS LIST

11 First storing unit
12 Receiving unit
13 First reading unit
14 First determination unit
15 First overwriting unit
16 Transmission unit
17 Second reading unit
18 Second determination unit
19 Second storing unit
20 Third determination unit
21 Third storing unit
22 Fourth determination unit
51 Setting table
52 Path change unit
53 Updating unit
54 Exception setting unit
55 Function of not allowing path to be changed
56 Interruption target setting unit
57 Function of not allowing transfer packet to be transmitted
301 to 305 Communication device

The invention claimed is:

1. A communication device that includes a plurality of communication ports and enables a communication packet to be transferred between different communication domains, the communication device comprising:
   a setting table for setting, for each of the communication ports, a communication domain to which the communication port belongs and a transfer destination address of a communication packet in each communication layer;
   a processor; and
   a storage medium having computer program instructions stored thereon, when executed by the processor, cause the processor to, when a communication port, of the plurality of communication ports, receives a transfer packet:
      read, from the transfer packet, transmission destination addresses and transmission destination communication domains in a highest communication layer that is highest and a lower communication layer that is lower than the highest communication layer;
      read out, from the setting table, an address and a communication domain in the lower communication layer that correspond to the transmission destination address in the highest communication layer;
      if the address in the lower communication layer read out from the setting table differs from the transmission destination address in the lower communication layer of the transfer packet, overwrite the transmission destination address and the communication domain in the lower communication layer of the transfer packet with the address and the communication domain in the lower communication layer read out from the setting table; and
      change a path for transmitting the transfer packet from the communication port that corresponds to the address and the communication domain in the lower communication layer read out from the setting table.

2. The communication device according to claim 1, wherein, when executed, the computer program instructions further cause the processor to, when the transfer packet is received, read, from the transfer packet, the transmission source addresses and the transmission source communication domains in the highest communication layer and the lower communication layer, and, if the addresses and the communication domains for the communication port that has received the transfer packet differ from addresses and communication domains written in the setting table, update the setting table such that the transmission source addresses and the transmission source communication domains in the highest communication layer and the lower communication layer read from the transfer packet are described as the addresses and the communication domains for the communication port that has received the transfer packet.

3. The communication device according to claim 2, further comprising: an exception setting unit in which a combination is described in advance, the combination being constituted by at least one of a specific communication port, an address in a specific communication layer, and a specific communication domain, or by at least two of the specific communication port, the address in the specific communication layer, and the specific communication domain; and a function of not allowing the path change unit to change the path if a combination is described in the exception setting unit, the combination being constituted by at least one of the communication port that has received the transfer packet, the communication port for transmitting the transfer packet, a transmission source address in one of the communication layers read from the transfer packet, a transmission destination address in one of the communication layers read from the transfer packet, a communication domain to which a transmission source communication device of the transfer packet belongs, and a communication domain to which a transmission destination communication device of the transfer packet belongs, or by at least two of the communication port that has received the transfer packet, the communication port for transmitting the transfer packet, the transmission source address in the one of the communication layers read from the transfer packet, the transmission destination address in the one of the communication layers read from the transfer packet, the one of the communication domains to which the transmission source communication device of the transfer packet belongs, and the one of the communication domains to which the transmission destination communication device of the transfer packet belongs.

4. The communication device according to claim 2, wherein the computer program instructions, when executed, further cause the processor to not allow the path change unit to change the path if the transmission destination address in the highest communication layer read from the received transfer packet is a multicast address.

5. The communication device according to claim 1, further comprising: an interruption target setting unit in which a combination is described in advance, the combination being constituted by at least one of a specific communication port, an address in a specific communication layer, and a specific communication domain, or by at least two of the specific communication port, the address in the specific communication layer, and the specific communication domain; and a function of not allowing the path change unit to transmit the transfer packet if a combination is described in the interruption target setting unit, the combination being constituted by at least one of the communication port that has received the transfer packet, the communication port for transmitting the transfer packet, a transmission source address in one of the communication layers read from the transfer packet, a transmission destination address in one of the communication layers read from the transfer packet, a communication domain to which a transmission source communication device of the transfer packet belongs, and a communication domain to which a transmission destination communication device of the transfer packet belongs, or by at least two of the communication port that has received the transfer packet, the communication port for transmitting the transfer packet, the transmission source address in the one of the communication layers read from the transfer packet, the transmission destination address in the one of the communication layers read from the transfer packet, the one of the communication domains to which the transmission source communication device of the transfer packet belongs, and the one of the communication domains to which the transmission destination communication device of the transfer packet belongs.

6. A communication method for enabling a communication device that includes a plurality of communication ports to transfer a communication packet between different communication domains, the method comprising:
    using a setting table in which, for each of the communication ports, a communication domain to which the communication port belongs and a transfer destination address of a communication packet are set in each communication layer; and
    when a communication port, of the plurality of communication ports, receives a transfer packet:
        reading, from the transfer packet, transmission destination addresses and transmission destination communication domains in a highest communication layer that is highest and a lower communication layer that is lower than the highest communication layer;
        reading out, from the setting table, an address and a communication domain in the lower communication layer that correspond to the transmission destination address in the highest communication layer;
        if the address in the lower communication layer read out from the setting table differs from the transmission destination address in the lower communication layer of the transfer packet, overwriting the transmission destination address and the communication domain in the lower communication layer of the transfer packet with the address and the communication domain in the lower communication layer read out from the setting table; and
        transmitting the transfer packet from a communication port, of the plurality of the communication ports, that corresponds to the address and the communication domain in the lower communication layer read out from the setting table.

7. A non-transitory computer readable medium including instructions executable by one or more processors to:
    using a setting table in which, for each of the communication ports in a plurality of communication ports, a communication domain to which the communication port belongs and a transfer destination address of a communication packet are set in each communication layer; and
    when a communication port, of the plurality of communication ports, receives a transfer packet:
        read from the transfer packet, transmission destination addresses and transmission destination communication domains in a highest communication layer that is highest and a lower communication layer that is lower than the highest communication layer;
        read out, from the setting table, an address and a communication domain in the lower communication layer that correspond to the transmission destination address in the highest communication layer;
        if the address in the lower communication layer read out from the setting table differs from the transmission destination address in the lower communication layer of the transfer packet, overwrite the transmission destination address and the communication domain in the lower communication layer of the transfer packet with the address and the communication domain in the lower communication layer read out from the setting table; and
        transmit the transfer packet from a communication port, of the plurality of the communication ports, that corresponds to the address and the communication domain in the lower communication layer read out from the setting table.

* * * * *